United States Patent
Pang et al.

(10) Patent No.: US 8,456,831 B1
(45) Date of Patent: Jun. 4, 2013

(54) MOUNTING APPARATUS FOR HARD DISK DRIVE

(75) Inventors: Wei Pang, Shenzhen (CN); Jun-Hui Wang, Shenzhen (CN); Kun Li, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/487,271

(22) Filed: Jun. 4, 2012

(30) Foreign Application Priority Data

Mar. 2, 2012 (CN) .......................... 2012 1 0053028

(51) Int. Cl.
*G06F 1/16* (2006.01)

(52) U.S. Cl.
USPC ............ 361/679.33; 361/679.31; 361/679.37; 248/221.11; 248/225.11; 248/222.11; 248/27.3

(58) Field of Classification Search
USPC ........ 248/27.1, 27.3, 225.11, 222.11, 221.11, 248/694, 551; 361/679.31, 679.32, 679.33, 361/679.34, 679.35, 679.36, 679.37, 679.38, 361/679.39, 679.58; 312/223.2, 302, 303
See application file for complete search history.

(56) References Cited

U.S. PATENT DOCUMENTS

| | | | | |
|---|---|---|---|---|
| 5,481,431 A | * | 1/1996 | Siahpolo et al. | 361/679.31 |
| 5,641,296 A | * | 6/1997 | Larabell et al. | 439/342 |
| 7,068,502 B2 | * | 6/2006 | Chen et al. | 361/679.39 |
| 7,090,528 B2 | * | 8/2006 | Tuttle et al. | 439/383 |
| 7,092,249 B2 | * | 8/2006 | Wang | 361/679.33 |
| 7,333,329 B2 | * | 2/2008 | Lambert et al. | 361/679.33 |
| 7,440,273 B2 | * | 10/2008 | Chen et al. | 361/679.33 |
| 7,450,376 B2 | * | 11/2008 | Chen et al. | 361/679.33 |
| 7,489,504 B2 | * | 2/2009 | Chen et al. | 361/679.37 |
| 7,697,279 B2 | * | 4/2010 | Yeh et al. | 361/679.39 |
| 7,830,656 B2 | * | 11/2010 | Ding | 361/679.37 |
| 8,070,125 B2 | * | 12/2011 | Sun | 248/560 |
| 8,243,433 B2 | * | 8/2012 | Yeh et al. | 361/679.33 |
| 2006/0227502 A1 | * | 10/2006 | Cheng | 361/685 |
| 2007/0014085 A1 | * | 1/2007 | Meserth et al. | 361/685 |
| 2007/0019377 A1 | * | 1/2007 | Chen et al. | 361/685 |
| 2008/0123280 A1 | * | 5/2008 | Chen et al. | 361/685 |
| 2011/0103000 A1 | * | 5/2011 | Sun | 361/679.33 |
| 2012/0243167 A1 | * | 9/2012 | Chen et al. | 361/679.31 |
| 2013/0070413 A1 | * | 3/2013 | Zhou | 361/679.33 |

* cited by examiner

*Primary Examiner* — Kimberly Wood
(74) *Attorney, Agent, or Firm* — Altis Law Group, Inc.

(57) ABSTRACT

A mounting apparatus for a hard disk drive includes a bracket and a resilient plate. The bracket includes a first and a second side plates each defining two slanted first notches, and two first slots respectively extending from rear ends of the first notches. The resilient plate is slidably mounted to the first side plate. A front end of the resilient plate defines a slanted second notch, and a semicircular second slot extending from a rear end of the second notch. When the resilient plate is at a first position, the second notch and the second slot respectively align with one of the first notches and a corresponding first slot of the first side plate. When the resilient plate is slid to a second position, the second slot aligns with a rear end of said corresponding first slot, and the second notch is staggered from the corresponding first notch.

8 Claims, 3 Drawing Sheets

MOUNTING APPARATUS FOR HARD DISK DRIVE

BACKGROUND

1. Technical Field

The present disclosure relates to an apparatus for mounting a hard disk drive.

2. Description of Related Art

Electronic devices, such as computers, generally include a frame, and a plurality of screws extending through the frame to fix a hard disk drive. However, these screws are small and difficult to handle, making the installation of the hard disk drive in the computer labor-intensive.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
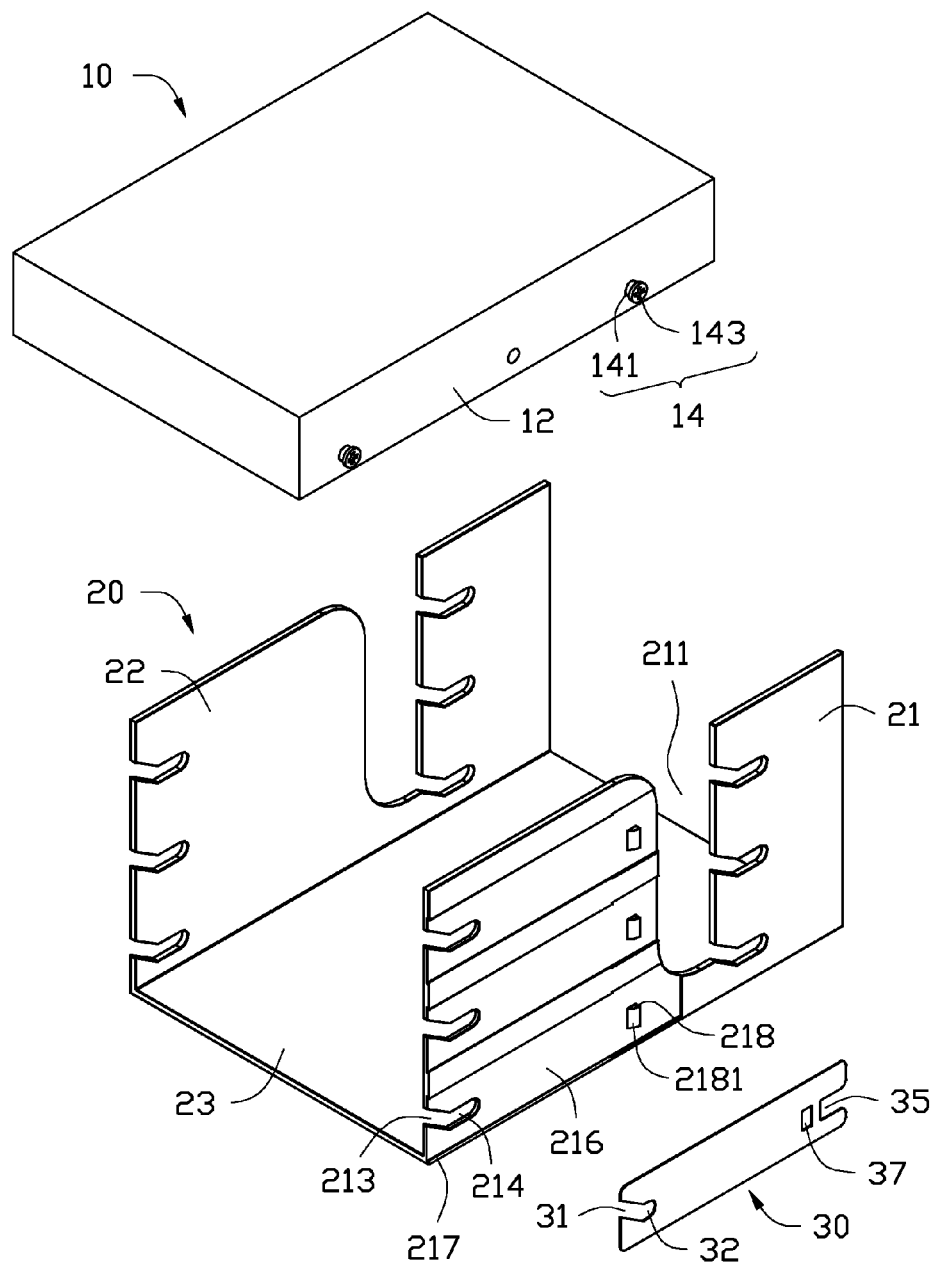
FIG. 1 is an exploded, isometric view of an exemplary embodiment of a mounting apparatus together with a hard disk drive.

FIG. 1 shows an exemplary embodiment of a mounting apparatus for a hard disk drive 10. The mounting apparatus includes a bracket 20 and a substantially rectangular resilient plate 30.

The hard disk drive 10 includes two opposite sidewalls 12. Two spaced fasteners 14 are respectively mounted to front and rear ends of each sidewall 12. Each fastener 14 includes a pole 141 connected to the sidewall 12 in a substantially perpendicular manner and a head 143 protruding from a distal end of the pole 141. A diameter of the head 143 is greater than a diameter of the corresponding pole 141. In the embodiment, the fasteners 14 are screws.

The bracket 20 includes a first side plate 21, a second side plate 22 opposite to the first side plate 21, and a bottom plate 23 connected between bottoms of the first and second side plates 21 and 22.

An opening 211 is defined in each of the first and second side plates 21 and 22, adjacent to the rear ends of the first and second side plates 21 and 22. The openings 211 respectively extend from top to bottom, through the tops of the first and second side plates 21 and 22. The front end of each of the first and second side plates 21 and 22 defines a first notch 213 slantingly extending down and back. A portion of each of the first and second side plates 21 and 22 bounding the rear side of the corresponding opening 211 also defines a first notch 213 slantingly extending down and back. The rear end of each first notch 213 further extends rearward to define an elongated horizontal first slot 214. A substantially rectangular recess 216 is defined in the outer surface of the first side plate 21, in front of the corresponding opening 211. The front end of the recess 216 extends through the front end of the first side plate 21, and communicates with the first notch 213 and the first slot 214 at the front end of the first side plate 21. Two flanges 217 extend toward each other from front sections of the outer sides of the top and the bottom of the recess 216. A block 218 protrudes from a middle of a rear section of the recess 216. A slanted surface 2181 extending outwards and backwards is formed on the front side of the block 218.

The front end of the resilient plate 30 defines a second notch 31 slantingly extending down and back. The rear end of the second notch 213 extends rearward to define a semicircular second slot 32. The second notch 31 is parallel to the first notches 213, and a length of the second notch 31 is equal to a length of each first notch 213. A horizontal cutout 35 is defined in a middle of the rear end of the resilient plate 30. A latching hole 37 is defined in the resilient plate 30, in front of the cutout 35.

Figure 2:
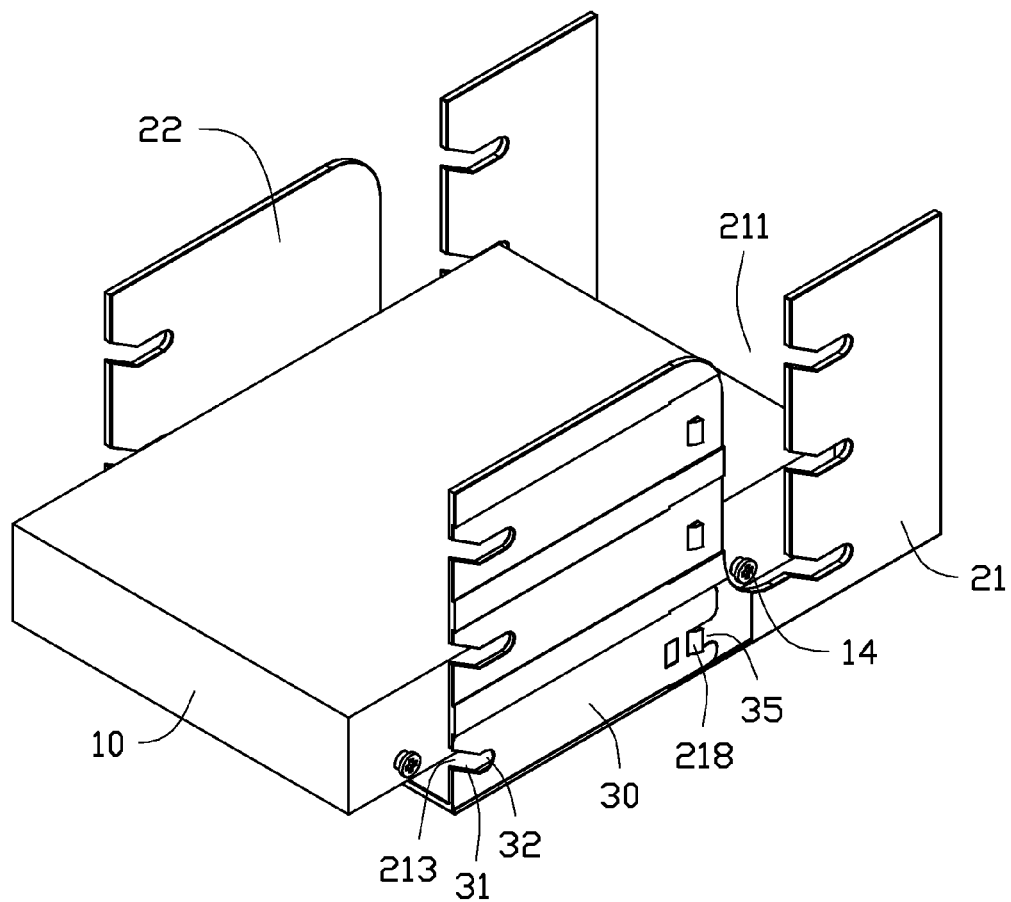
FIGS. 2 and 3 are assembled, isometric views of the mounting apparatus and the hard disk drive of FIG. 1 in different states.
Figure 3:
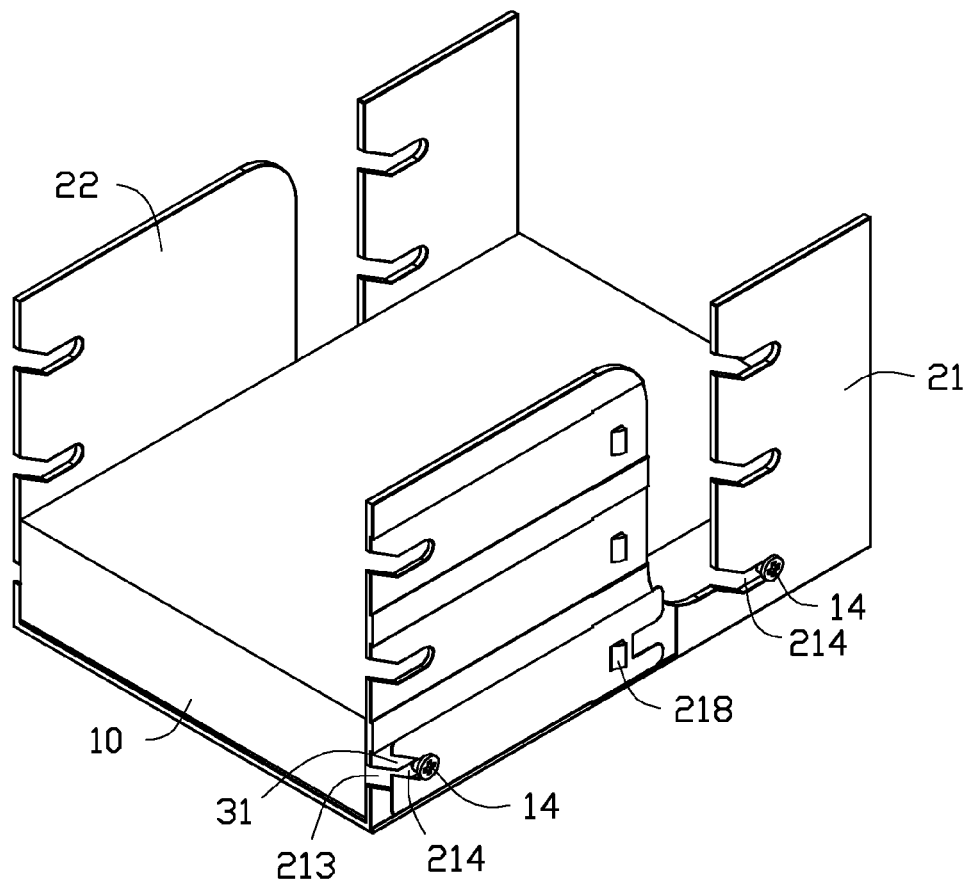

Referring to FIGS. 2 and 3, in assembly, the resilient plate 30 is inserted into the recess 216 from the front end of the recess 216. The flanges 217 respectively engage with the top and the bottom of the outer surface of the resilient plate 30. The resilient plate 30 is slid back, until the block 218 engages with a portion of the resilient plate 30 bounding the front end of the cutout 35. The second notch 31 aligns and overlaps with the first notch 213 at the front end of the first side plate 21. The second slot 32 aligns and overlaps with the front end of the first slot 214 at the front end of the first side plate 21.

The hard disk drive 10 is placed above the bracket 20, with the fasteners 14 at the front ends of the sidewalls 12 arranged in front of the bracket 20, and the fasteners 14 at the rear ends of the sidewalls 12 respectively aligning with the openings 211. The hard disk drive 10 is moved down, to allow the fasteners 14 at the rear ends of the sidewalls 12 to be respectively received in the openings 211. When all the fasteners 14 respectively align with the first notches 213, the hard disk drive 10 is moved back, to allow the poles 141 to correspondingly engage in the first notches 213 and move down and back along the first notches 213 to engage in corresponding first slots 214. One of the poles 141 engaging in the first slot 214 at the front end of the first side plate 21 abuts against a portion of the resilient plate 30 bounding the rear end of the second slot 32. The head 143 connected to the pole 141 engages with the outer surface of the resilient plate 30. The heads 143 of the other three fasteners 14 respectively engage with the outer surfaces of the first and second side plates 21 and 22.

The hard disk drive 10 is slid back along the first slots 214, the pole 141 abutting against the resilient plate 30 pushes the resilient plate 30 backwards. The portion of the resilient plate 30 bounding the front end of the cutout 35 abuts against the slanted surface 2181 to be deformed outwards to pass over the block 218. The block 218 engages with the inner surface of the rear end of the resilient plate 30. When the block 218 aligns with the latching hole 37, the rear end of the resilient plate 30 is restored, to allow the block 218 to engage in the latching hole 37. Thereby, the resilient plate 30 is locked to the first side plate 21.

At this moment, the second slot 32 aligns and overlaps with the rear end of the first slot 214 at the front end of the first side plate 21. The poles 141 respectively abut against the portions of the first and second side plates 21 and 22 bounding the rear ends of the first slots 214, and cannot move further back. The second notch 31 is moved to be partially overlapping the corresponding first slot 214 and staggered from the corresponding first notch 213. The pole 141 engaging in the second notch 32 is restricted by the corresponding horizontal first slot 214 and the slanted second notch 31, and cannot move forward. Thereby, the hard disk drive 10 is locked to the bracket 20.

To detach the hard disk drive 10 from the bracket 20, the rear end of the resilient plate 30 is deformed outwards, to allow the block 218 to disengage from the latching hole 37. The hard disk drive 10 and the resilient plate 30 are moved forwards, to allow the block 218 to engage in the cutout 35. The second notch 31 aligns and overlaps with the corresponding first notch 213 at the front end of the first side plate 21, and the poles 141 are respectively slid to the front ends of the first slots 214. The hard disk drive 10 is slid forward and upward, to allow the poles 141 to slide along the first notches 213 until disengage from the first notches 213. Thereby, the hard disk drive 10 can be moved up and detached from the bracket 20.

Even though numerous characteristics and advantages of the embodiments have been set forth in the foregoing description, together with details of the structure and the functions of the embodiments, the disclosure is illustrative only, and changes may be made in details, especially in the matters of shape, size, and arrangement of parts within the principles of the embodiments to the full extent indicated by the broad general meaning of the terms in which the appended claims are expressed.

What is claimed is:

1. A mounting apparatus for a hard disk drive, comprising:
a bracket comprising a first side plate and a second side plate opposite to the first side plate, wherein an opening is defined in each of the first and second side plates adjacent to rear ends of the first and second side plates, a front end of each of the first and second side plates and a portion of each of the first and second side plates bounding a rear end of the corresponding opening each define a first notch slantingly extending down and back, and an elongated first slot extending back from a rear end of the first notch; and
a resilient plate mounted to an outer surface of the first side plate and capable of sliding between a first position and a second position, wherein a front end of the resilient plate defines a second notch slantingly extending down and back, and a semicircular second slot extending back from a rear end of the second notch, when the resilient plate is slid to the first position, the second notch aligns and overlaps with one of the first notches of the first side plate, and the second slot aligns and overlaps with a front end of a corresponding one of the first slots of the first side plate; when the resilient plate is slid rearward to the second position, the resilient plate is locked to the first side plate, with the second slot aligning and overlapping with a rear end of said corresponding one of the first slots, and the second notch partially overlapping said corresponding one of the first slots and staggered from the corresponding first notch.

2. The mounting apparatus of claim 1, wherein a recess is defined in the outer surface of the first side plate, said corresponding first notch and said corresponding first slot communicate with a front end of the recess, and the resilient plate is slidably received in recess.

3. The mounting apparatus of claim 2, wherein two flanges extend toward each other from front sections of outer sides of a top and a bottom of the recess, to respectively engage with front sections of a top and a bottom of an outer surface of the resilient plate.

4. The mounting apparatus of claim 2, wherein a block protrudes from a rear section of the recess, a latching hole is defined in a rear section of the resilient plate, when the resilient plate is slid to the second position, the block engages in the latching hole.

5. The mounting apparatus of claim 4, wherein a slanted surface extending outwards and backwards is formed on a front side of the block, to abut against and deform a rear end of the resilient plate outwards until the block engages in the latching hole.

6. The mounting apparatus of claim 5, wherein a cutout is defined in a rear end of the resilient plate, to receive the block when the resilient plate at the first position, when the resilient plate is slid to the second position, a portion of the resilient plate bounding a front end of the cutout abuts against the slanted surface of the block to be deformed outwards to pass over the block.

7. The mounting apparatus of claim 2, wherein the recess is defined in the outer surface of the first side plate, in front of the opening of the first side plate, the front end of the recess extends through the front end of the first side plate and communicates with the first notch and the first slot at the front end of the first side plate.

8. The mounting apparatus of claim 1, wherein the openings respectively extend from top to bottom, through tops of the first and second side plates.

* * * * *